United States Patent [19]

Kreinberg

[11] 4,326,161
[45] Apr. 20, 1982

[54] BATTERY REGULATION CIRCUIT

[75] Inventor: Earl R. Kreinberg, Marietta, Ga.

[73] Assignee: Protection Services, Inc., Harrisburg, Pa.

[21] Appl. No.: 85,802

[22] Filed: Oct. 17, 1979

[51] Int. Cl.³ .............................................. G05F 5/00
[52] U.S. Cl. .................................... 323/299; 315/307
[58] Field of Search .......................... 323/17, 19, 299; 363/21; 315/158, 159, 200 A, 307; 307/265

[56] References Cited

U.S. PATENT DOCUMENTS

| | | | |
|---|---|---|---|
| 3,419,781 | 12/1968 | Jullien-Davin | 363/21 |
| 3,946,302 | 3/1976 | Kovalich et al. | 323/19 |
| 4,156,166 | 12/1976 | Shapiro et al. | 315/209 R |
| 4,230,970 | 10/1980 | Potter et al. | 323/299 |
| 4,237,405 | 12/1980 | Kelus | 323/299 |

FOREIGN PATENT DOCUMENTS 2801385 7/1978 Fed. Rep. of Germany ... 315/200 A
2815033 10/1979 Fed. Rep. of Germany ... 315/200 A

OTHER PUBLICATIONS

"Switching Supplies Save Energy, Materials, Weight and Space", Product Engineering, Jun. 1977.

Primary Examiner—William H. Beha, Jr.
Attorney, Agent, or Firm—Amster, Rothstein & Engelberg

[57] ABSTRACT

A circuit is disclosed which extends the useful life of a battery by regulating the power supplied from the battery to a load, such as a highway warning lamp, as the battery voltage decreases from age and use. The circuit supplies current from the battery to the load over periods of time which are automatically varied in length according to the battery terminal voltage, thereby maintaining the average power consumption at a fixed level throughout the useful life of the battery.

9 Claims, 12 Drawing Figures

BATTERY REGULATION CIRCUIT

DESCRIPTION OF THE INVENTION

The present invention relates generally to electrical power regulations systems, and more particularly to electrical circuitry which operates to vary the period of time current is delivered to a load over successive time intervals in accordance with the voltage of a voltage source, so that the average power consumed by the load is maintained constant.

As the number of automobiles and trucks using the nation's roads and highways continues to increase each year, highway maintenance and repair activities have become matters of great concern to local, state and federal agencies charged with these duties. However, while such activities are being carried out on a roadway, it is often highly impractical, if not impossible, to detour oncoming traffic, especially if no suitable alternate routes are easily accessible. Thus, the motorist is usually alerted by signs to the presence of workmen and equipment on the roadway some distance before approaching the work site, and is then guided into one or more safe lanes so that he or she can safely pass the site at a reduced speed.

Alerting the motorist to ongoing work or some other potential hazard such as an accident on the roadway is, of course, of utmost importance in the interests of safety. However, providing warning signs alone is not always adequate, especially during night hours when the motorist's headlights may not directly impinge on the signs and illuminate them sufficiently to catch the driver's attention. Furthermore, even during daylight hours, it is not uncommon for motorists to disregard signs on or along the road, as their attention may be diverted on other matters. It has therefore become common practice to provide physical obstructions, such as posts or barricades, directly on the road under the assumption that the driver will readily take notice of them and steer out of their path into those lanes left open for safe passage. Nevertheless, as with warning signs, barricades often go unnoticed under low level lighting conditions and are struck by vehicles.

In order to make certain that warning signs, barricades and the like are clearly visible and will be heeded by the motorist, warning lamps are placed on or closely adjacent to the signs and barricades, thereby attracting the motorist's attention under all lighting conditions and without relying upon vehicle headlamps. These warning lamps may be continuously illuminated, or may periodically flash at given intervals and with sufficiently high intensity to draw the motorist's attention, even during daylight hours.

Naturally, the lamps require a source of power to operate, and portable power sources such as batteries are commonly used with them. It is therefore very important to obtain maximum battery life so that sites where the lamps are in use need not be frequently visited to check for proper lamp operation, and that the overall cost involved in the use of warning lamps for greater highway safety can be reduced. More extensive use of these lamps is thereby encouraged.

Battery life can be substantially increased if the average power consumption of the lamps is held at a constant level during the useful battery life rather than allowing power drawn from the battery to be at a relatively high level when the battery is first put into service, and to gradually diminish as the battery voltage decreases with continued service. Circuitry which is intended to perform such a function is disclosed in U.S. Pat. No. 4,156,166, wherein the lamp voltage is continuously monitored and compared with a fixed reference voltage source to provide an error signal. This error signal is then used to control the duty cycle over which current is supplied to the lamp according to the patent to obtain a constant light flux.

High efficiency regulator circuits are also known which operate to maintain constant power consumption by a load. Such circuits use a switched pass transistor in series with the load and a voltage supply which may vary, e.g., a battery. These circuits also work by sampling the voltage across the load and comparing it with a fixed reference voltage source to provide a variable pulse width signal which, in turn, switches the pass transistor on and off at a particular rate to maintain the output voltage constant. Such a circuit is described in an article entitled "Switching Supplies Save Energy, Materials, Weight and Space," *Products Engineering* at pages 51–52 (June 1977). However, these regulating circuits require relatively large reactive filtering components, thereby adding to their cost and physical size, and do not lend themselves to portable roadway warning lamp applications where space and weight factors are important. Further, as with the circuitry of U.S. Pat. No. 4,156,166, a stable, fixed reference voltage source is necessary for accurate regulation of the power consumed by the load. In addition, this patent requires a feedback control circuit.

It is an object of the present invention to overcome the above and other shortcomings in prior regulating circuits.

It is another object of the present invention to provide a system for regulating power delivered by a battery to a load so that average power consumption is maintained constant during the useful life of the battery and the battery life is substantially increased.

It is yet another object of the present invention to provide a system for regulating power delivered by a battery to a warning lamp wherein the lamp may be either continuously illuminated or intermittently flashed.

It is a further object of the present invention to provide a system for regulating power delivered to a load without the need for a fixed reference voltage source.

It is still a further object of the present invention to provide a system for regulating the power delivered to a battery operated lamp by using a minimal quantity of relatively inexpensive components.

These and other objects are carried out in accordance with the invention by providing a regulating circuit which supplies current to the load over a time period which varies in accordance with the source voltage.

It is a further object of the invention to provide a system for regulating power delivered to a battery-operated lamp wherein the system can be automatically disabled during a time period that lamp operation is not required.

These and other objects are provided in accordance with the present invention by delivering current to a load during an ON portion of an ON-OFF lamp cycle and by automatically varying the length of time current flows through the load in accordance with the magnitude of the battery voltage. In a particular embodiment of the invention, periodic current pulses flow through the load during the ON portion of the ON-OFF lamp cycle, the duration of each pulse being automatically varied in accordance with the magnitude of the battery voltage. Thus, when the battery is first placed in service, the magnitude of the battery voltage is highest and the pulse duration is shortest. As the battery ages and the magnitude of the battery voltage decreases, the pulse duration is automatically increased. In this manner, average power consumed by the load is constant over a wide range of battery voltage during the useful life of the battery. When the load is a lamp, the pulse repetition rate during the ON portion of the lamp cycle is sufficiently rapid so that the lamp appears to be steadily ON.

In one embodiment of the invention, the duration of the current pulses is controlled by a switching circuit which changes state when the input voltage to the switch reaches the threshold switching voltage. This switching circuit has the property that the magnitude of the threshold switching voltage decreases as the magnitude of the battery voltage decreases. The input to the switching circuit is coupled to a charging circuit and to a discharging circuit while the output of the switching circuit is coupled to the load. In operation, the charging circuit produces an increasing voltage at the input terminal to the switching circuit. When this increasing input voltage reaches the threshold switching voltage of the switch, the switch changes from its first state, wherein no current flows through the load, to a second state wherein current flows through the load. The discharge circuit is arranged to periodically produce a discharging voltage at the input to the switching circuit. Application of the discharging voltage lowers the input voltage to the switching circuit below its threshold switching voltage, causing the switching circuit to return to its first state, thereby removing current from the load. Thus, current flows through the load only during the time interval between the time that the charging voltage attains the threshold switching voltage and the onset of the discharging potential. Since the switching circuit is arranged so that its switching threshold voltage decreases as the magnitude of the battery voltage decreases, the threshold switching voltage will be attained at the input to the switching circuit by the charging circuit at an earlier time relative to the periodically generated discharging voltage as the magnitude of the battery voltage decreases. Therefore, current will flow through the load circuit for a longer period of time as the source voltage decreases, thereby maintaining the average power consumption constant.

The above brief description, as well as further objects, features and advantages of the present invention will be more fully understood by reference to the following detailed description of the presently preferred, but nonetheless illustrative embodiments, in accordance with the present invention, when taken in conjunction with the accompanying drawings, wherein.

Figure 3:
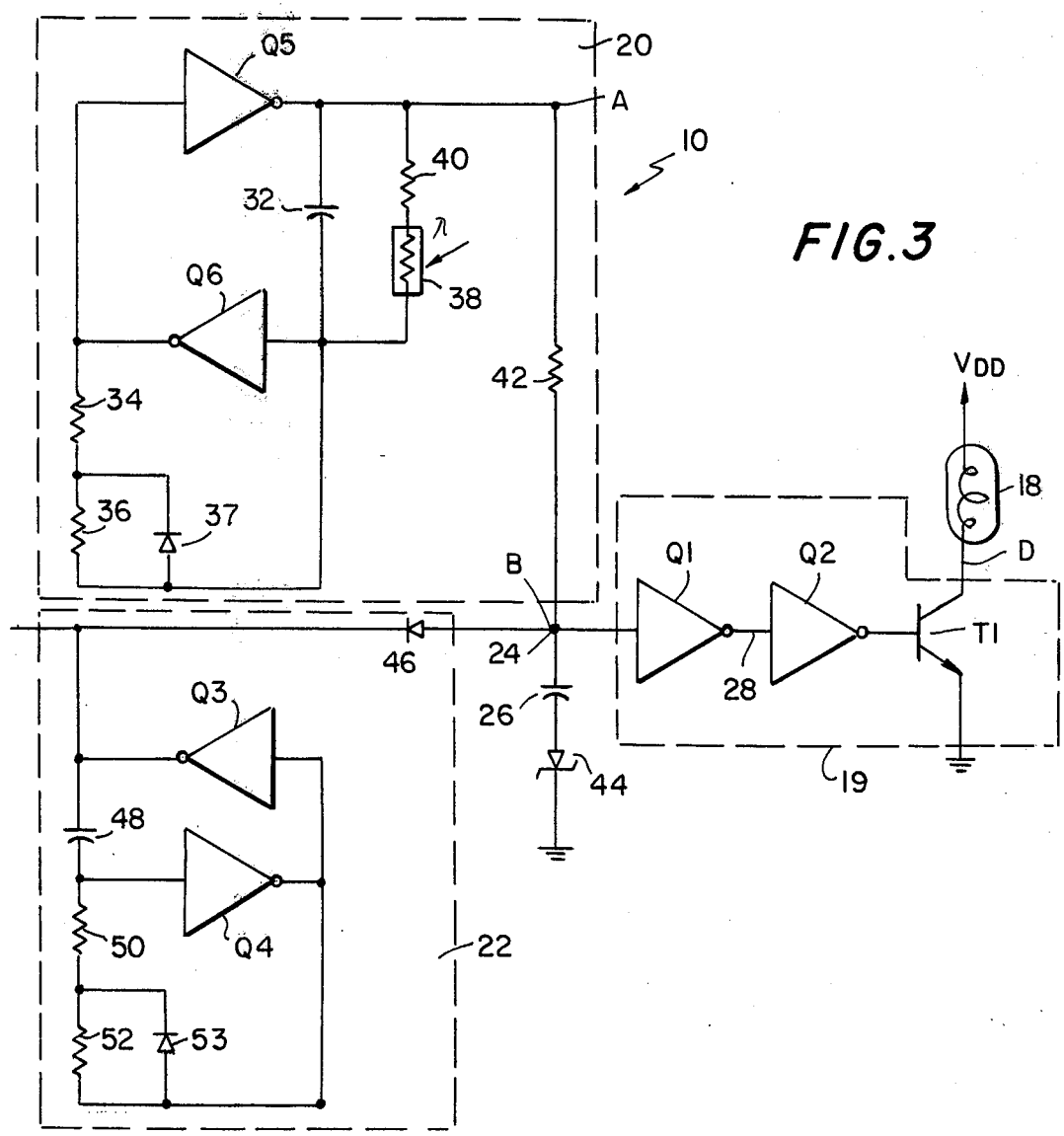
FIG. 3 is an electrical schematic diagram of a power regulated lamp circuit in accordance with the present invention, which operates to automatically maintain the average power consumed by the lamp substantially constant during the useful life of the battery.
Figure 6:
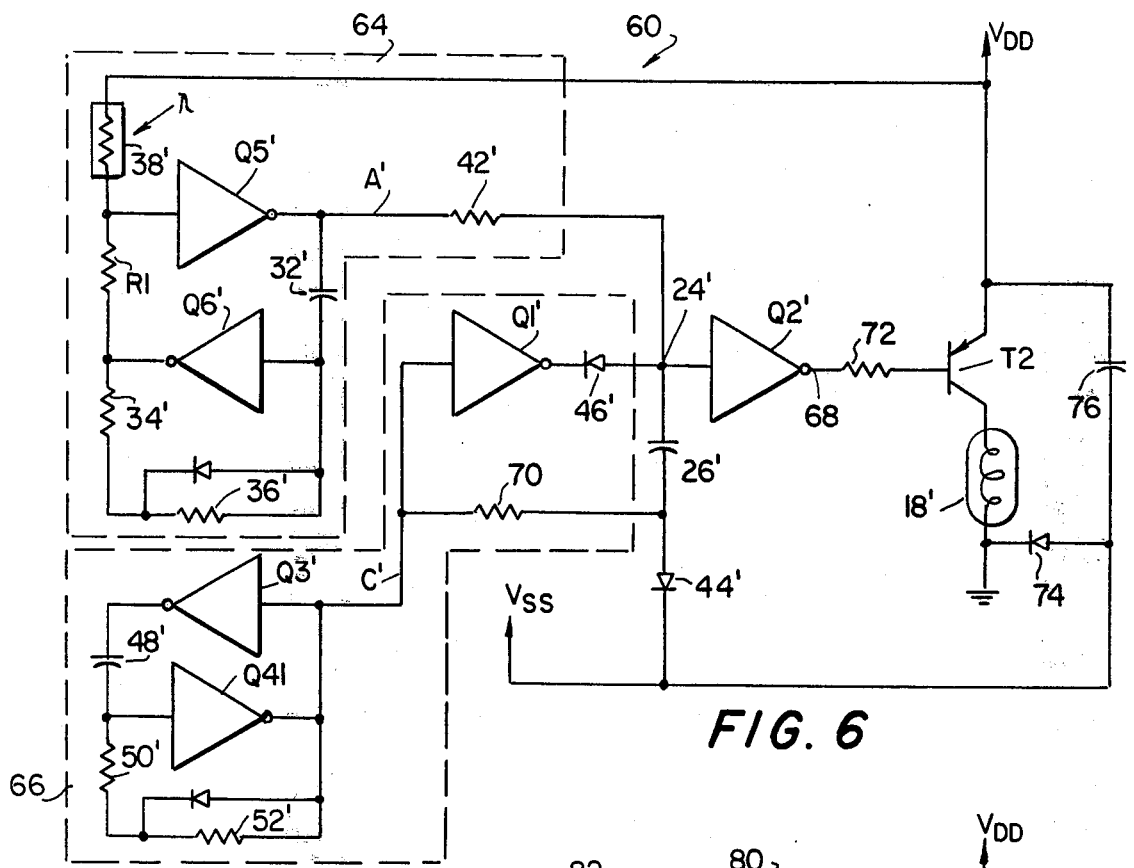
Figure 7:
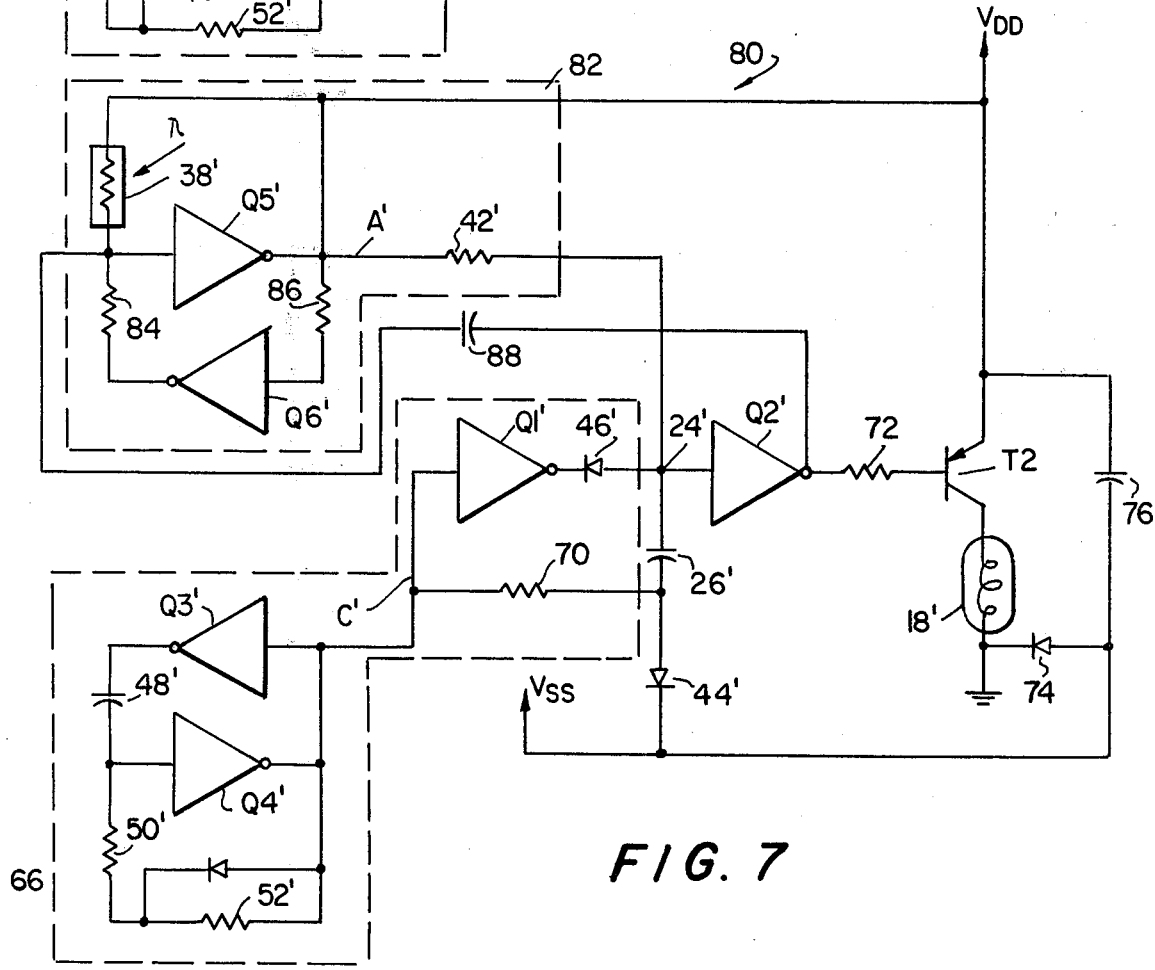

FIGS. 5(a)–5(f) are graphs which illustrate voltage waveforms at various points in the circuit of FIG. 3 for both high and low battery supply voltages and are useful in the explanation of circuit operation;

FIG. 6 is an electrical schematic diagram of a second embodiment of a power regulated lamp circuit in accordance with the present invention, the circuit operating to intermittently flash the lamp and to maintain it in an OFF state during daylight hours; and, FIG. 7 is an electrical schematic diagram of a third embodiment of a power regulated lamp circuit in accordance with the present invention, the circuit operating to maintain the lamp in a steady ON state except during daylight hours.

Figure 1:
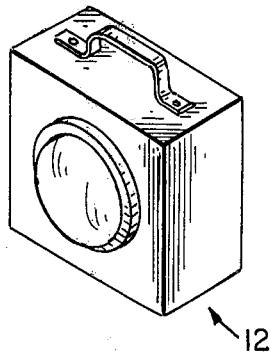
FIG. 1 is a perspective view of a portable warning lamp such as may be located on a roadway to alert oncoming motorists to the existence of a hazardous road condition.
Figure 2:
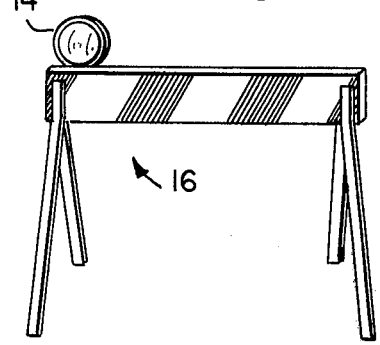
FIG. 2 is a perspective view of a barricade having a warning lamp mounted thereon for placement on a roadway in the vicinity of a work site or hazardous road condition.

Referring now in detail to the drawing, and initially to FIGS. 1–3 thereof, there is provided a battery regulation circuit 10 (FIG. 3) in accordance with the present invention, the circuit 10 occupying a relatively small volume so as to enable it to be contained along with a battery (not shown) inside a portable warning lamp 12 (FIG. 1) or within a lamp housing 14 mounted atop a road barricade 16 (FIG. 2). The portable warning lamp 12 is of the type which can be used in numerous instances to alert oncoming motorists to the presence of a hazard or construction on a roadway, and can be used alone or along with one or more like units, as may be required. The lamp 12 can be placed on the road surface, atop a road divider or barricade, or even on a work vehicle. The road barricade 16 is of the type which is typically set up on the road ahead of a work site to lead motorists into lanes which are safe for passage, and includes a lamp within the housing 14, the latter being secured to the barricade and moved in a position such that the lamp will be visible to oncoming motorists.

The circuit 10 of FIG. 3 is operative to extend the useful life of a battery used to illuminate a lamp within the portable warning lamp 12, or within the housing 14 atop the road barricade 16. Circuit 10 can, of course, be used to extend battery life in many other applications, including those unrelated to roadway warning lamps.

Referring to FIG. 3, the circuit 10 operates to periodically flash lamp 18 through an ON-OFF lamp cycle. Typically, the ON portion of the cycle during which lamp 18 is illuminated is 0.1 seconds and the OFF portion of the lamp cycle is 0.9 seconds. Circuit 10 includes a switching circuit generally referred to by reference numeral 19 having an input terminal 24 and an output terminal D coupled to lamp 18. The threshold switching voltage of switching circuit 19, which is the magnitude of the voltage at the input terminal 24 required to change the state of the switching circuit to permit current to flow through lamp 18, varies with the magnitude of the battery supply voltage, $V_{DD}$, the threshold switching voltage decreasing as the magnitude of the battery voltage decreases as described below. The voltage is supplied to input terminal 24 by charging circuit 20, capacitor 26 and zener diode 44 during the ON portion of the lamp cycle. The charging circuit produces an increasing voltage at terminal 24 which, when it reaches the threshold switching voltage, causes switching circuit 19 to change from a first state wherein no current flows through lamp 18 to a second state permitting current flow through lamp 18. Also coupled to terminal 24 is discharging circuit 22. Discharging circuit 22 periodically produces a signal at terminal 24 which causes the voltage at terminal 24 to decrease below that required to maintain switching circuit 19 in its second state thereby causing switching circuit 19 to switch back to its first state preventing current from flowing through lamp 18. Thus, current flows through lamp 18 only during the interval between the time that the threshold switching voltage is reached during the charging cycle and the onset of the discharge voltage. After the occurrence of the discharge voltage, the voltage at terminal 24 begins to increase again, and when the threshold switching voltage is reached, current will again flow through lamp 18. Thus, during the ON portion of the lamp cycle, current is periodically pulsed through lamp 18. The duration and repetition rate of these pulses are arranged, however, so that the lamp appears to be lit continuously during the ON portion of the lamp cycle. During the OFF portion of the lamp cycle, the magnitude of the voltage at terminal 24 is maintained below the threshold switching voltage.

Figure 4:
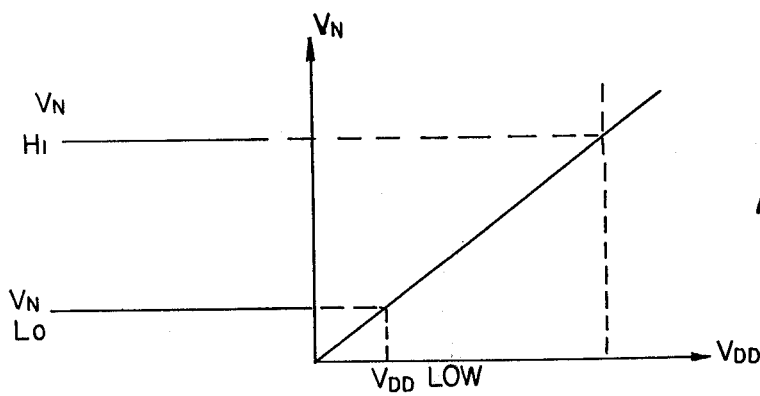
FIG. 4 is a graph which illustrates the manner that the threshold switching voltage of one of switches in FIG. 3 varies with the magnitude of the battery voltage.
Figure 5:
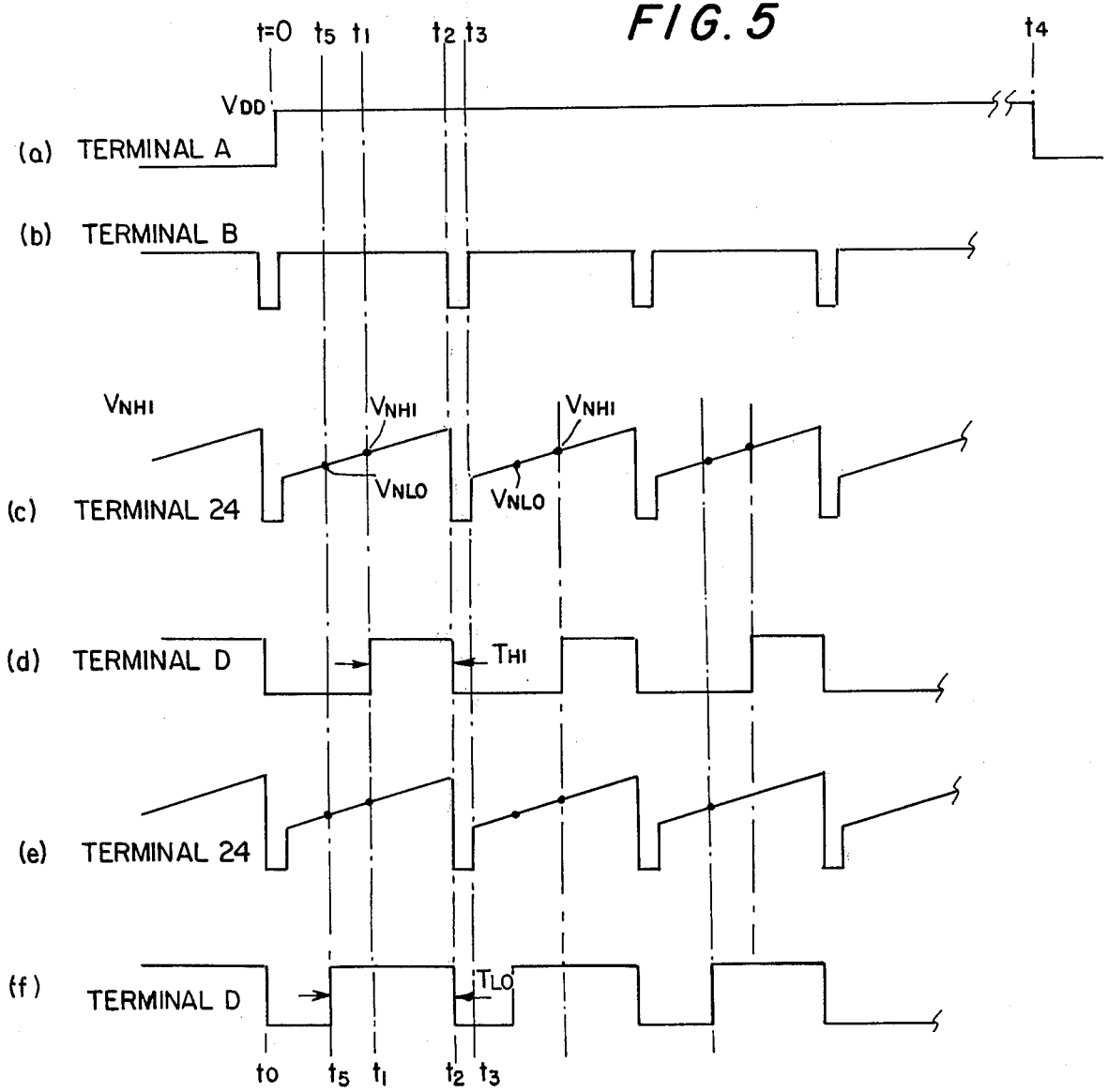

The operation of the circuit of FIG. 3 can be further understood by referring to FIGS. 4 and 5. FIG. 4 is a graphical representation of the magnitude of the threshold switching voltage referred to as $V_N$, as a function of the magnitude of the battery voltage $V_{DD}$. Schmidt triggers Q1 and Q2 in switch 19 may be provided on the RCA CD40106B integrated circuit, for example. It is well known that the threshold switching voltage required to trigger CMOS gates, such as the CD40106B Schmidt triggers, is a fixed proportion (such as 0.6) of the supply voltage $V_{DD}$. It is apparent that at high values of $V_{DD}$, for example, $V_{DD\ HIGH}$, the threshold switching voltage is relatively high, for example, $V_{N HI}$. At lower battery voltage, for example, $V_{DD LOW}$, which will occur during normal battery life, the threshold switching voltage is lowered, for example, to $V_{N LO}$. This property of the switching circuit 19 is utilized to increase the duration of current flow through lamp 18 as the battery voltage decreases, thereby maintaining substantially constant power to lamp 18 for an extended period of time, to increase the useful life of the battery.

Referring back to FIG. 3 and to FIG. 5(a), it is seen that at the onset of the ON portion of the lamp cycle voltage at terminal A in charging circuit 10 increases from zero to $V_{DD}$. During the time that the voltage at terminal A is equal to $V_{DD}$, the circuit is in the ON portion of the lamp cycle. Referring to FIG. 5(c), which shows the voltage at terminal 24 just prior to the start of the ON portion (t=0) of the lamp cycle, terminal 24 is at a potential below the threshold switching voltage thereby maintaining switching circuit 19 in its first state. When the voltage at terminal A is switched to battery voltage (t=0) and assuming that the battery voltage is high, $V_{DD\ HIGH}$, at the start of the ON portion of the lamp cycle, the voltage at terminal 24 begins to rise exponentially. When the voltage at terminal 24 has increased to $V_{N HI}$, the threshold switching voltage for a battery voltage of $V_{N\ HIGH}$, (t=t_1) switch circuit 19 changes to its second state, and current flows through lamp 18 as indicated in FIG. 5(d). Thereafter, discharge circuit 22 applies a negative pulse at terminal B (FIG. 3 and FIG. 5(c)), (t=t_2) causing terminal 24 to switch to a negative potential below the threshold switching voltage (FIG. 5(b)). Switching circuit 19 reverts to its initial or OFF state, and the current to lamp 18 terminates. Thus, current flows through lamp 18 terminal D for a period of time $t=T_{HI}$ indicated in FIG. 5(d). After the conclusion of the discharge pulse (t=t_3) the voltage at terminal 24 begins to rise again towards the threshold switching voltage. In this manner, a series of current pulses flow through lamp 18 during the ON portion of the lamp cycle. At the conclusion of the ON portion of the lamp cycle (t—t_4), the voltage at terminal A is returned to zero (FIG. 5(a)), and the lamp remains OFF for the remainder of the cycle.

The effect of lower battery voltage, $V_{DD LOW}$, can be seen by reference to FIGS. 5(e) and (f). Thus, as before, at the start of the ON portion of the lamp cycle, the voltage at terminal 24 starts to rise. However, it reaches the threshold switching voltage $V_{N LO}$ for the lower battery voltage, $V_{DD LOW}$, at time t=t_5, which is sooner than the threshold switching voltage is reached for the higher battery voltage. Current flows through lamp 18, terminal D, from the time the magnitude of the voltage at terminal 24 reaches $V_{N LO}$ until the occurrence of the discharging pulse at terminal B (FIGS. 5(b) and 5(f)). Thus, with lower battery voltage, current flows through lamp 18 for a time $T_{LO}$, which is greater than the time $T_{HI}$ during which current flows through the lamp for a higher battery voltage; the difference in time being established by the difference in threshold switching voltage for the switching circuit, which threshold switching voltage is directly related to the difference in battery voltages. Of course, the amount of time $t_{TH}$ from time t=0 required to reach the threshold also depends on the rate at which capacitor 26 charges, which in turn depends on $V_{DD}$. It can be shown that $t_{TH}$ is given by $$RC \ln |(V_{DD}-V_0)/(V_{DD}-V_{TH})|,$$

where R is the resistance of resistor 22, C is the capacitance of capacitor 26, $V_0$ is the voltage across capacitor 26 at t=0, $V_0$ being equal to the turn-on voltage of diode 46 (0.7 v) plus the zener voltage of diode 44 (usually several volts), $V_{TH}$ being the threshold voltage. Assuming for the sake of simplicity that $V_{TH}=\frac{1}{2} V_{DD}$, and that $V_0=4$ volts, $V_{DD}=10$ volts yields $t_{TH}=\ln(1.20)$, while $V_{DD}=12$ volts yields $t_{TH}=\ln(1.33)$, thus requiring more time to turn on for a 12 volt supply than for a 10 volt supply.

Referring back to FIG. 3, charging circuit 20 includes Schmitt triggers Q5 and Q6, and associated circuitry including resistors 34, 36, 42, diode 37 and capacitor 32 for delivering the charging current to terminal 24 to charge capacitor 26 and provide the threshold switching voltage at terminal 24. Discharging circuit 22 includes Schmidt triggers Q3 and Q4 and associated circuitry including resistors 50, 52, capacitor 48 and diode 53 which are connected to form a high frequency oscillator to periodically produce a discharging voltage at terminal 24 to discharge capacitor 26. Typically, each pulse is 5 microsec. long and the interval between pulses is 250 microsec. Switching circuit 19 includes Schmidt trigger Q1 which has its input coupled to terminal 24 and provides a signal at its output terminal 28 which switches Schmidt trigger Q2 and transistor T1 on and off in response to the voltage at terminal 24. Schmidt triggers Q1 through Q6 respectively, or all may be provided together on a single integrated circuit chip such as RCA-type CD40106B, or equivalent. Of course, Schmidt triggers Q1–Q6 may also be provided in two or more separate packages, if desired. Operating voltage is supplied to Q1–Q6 from battery supply Vdd by unshown connecting leads but as is well known.

Schmidt triggers Q5 and Q6 are arranged to provide, at terminal A, a recurring voltage waveform which is above ground potential or "high" for the ON portion of the lamp cycle, and which is at or near ground potential, or "low" during the OFF portion of the lamp cycle. The relative ON-OFF time is controlled by appropriate selection of feedback capacitor 32 and resistors 34 and 36 as is well known. Terminal A can be maintained continually at low voltage during daylight hours to keep lamp 18 OFF, if desired, by including a photosensitive resistor 38 and bias resistor 40 coupled between the output of Schmidt trigger Q5 and the input of Schmidt trigger Q6. During daylight hours, current flows through the photosensitive resistor and the voltage at terminal A remains low. The voltage at terminal A is applied to terminal 24 through a charging resistor 42 and zener diode 44 to charge capacitor 26. Zener diode 44 is selected to maintain the voltage at terminal 24 at a predetermined positive voltage to prevent operation of the switching circuit when the battery voltage drops below a selected minimum. Thus, when the voltage at terminal A is initially switched to a high potential, a voltage with positive slope is generated at terminal 24 as capacitor 26 charges. The rate at which capacitor 26 is charged, and hence the rate at which the voltage at terminal 24 increases is determined by the product of the value of resistor 42 and the value of capacitor 26 as is known in the art. When the voltage at terminal 24 reaches the threshold switching level for Schmidt trigger Q1, the output voltage of Schmidt trigger Q1 changes from high to low, causing Schmidt trigger Q2 to change its state from low to high, switching transistor T1 ON, permitting current to flow through lamp 18. As explained above, since the input voltage to Schmidt trigger Q1 increases at a rate determined by resistor 42 and capacitor 26, the threshold voltage required to switch the output of Q1 will be reached later when the battery voltage is at $V_{DD\ HIGH}$ as compared to when the battery voltage is at $V_{DD\ LOW}$. The discharge circuit 22 operates to rapidly discharge capacitor 26 through diode 46 to the positive voltage established by the zener diode at a time after Schmidt trigger Q1 switches from its high to its low state. Discharging of capacitor 26 reduces the input voltage at the input to Schmidt trigger Q1 below the threshold switching value and switches the output of Q1 back to its first state. Transistor T1 is switched off through Q2 and further current is blocked from passing through lamp 18. Capacitor 26 then recharges as explained above, and again generates a voltage waveform of positive slope which is applied to the input of Schmidt trigger Q1.

Therefore, during the 0.1 second that the voltage at terminal A is high and lamp 18 is to be flashed ON, the output of Schmidt trigger Q1 is periodically switched from high to low. For the particular circuit described, there is created approximately 400 successive time periods during which current flows through transistor T1. The length of each time period varies inversely with the supply voltage $V_{DD}$. In the case of a battery supply voltage of $V_{DD\ HIGH}$ these time periods are indicated by $T_{HI}$ in FIG. 5(d) and, in the case of a battery supply voltage $V_{DD\ LOW}$, these time periods are indicated by $T_{LO}$ in FIG. 5(f), wherein $T_{LO}$ is longer in duration than $T_{HI}$. Thus, substantially constant power is provided to the lamp 18 for both these values of battery supply voltage.

It will be understood for intermediate values of the battery supply voltage $V_{DD}$, the value of the corresponding threshold switching voltage $V_N$ for Schmidt trigger Q1 will be attained at times intermediate those times at which $V_{N\ LO}$ and $V_{N\ HI}$ are attained, and that the duration of the periods over which lamp current will flow will be intermediate the time periods $T_{LO}$ and $T_{HI}$, respectively. The power consumed by the lamp 18 will therefore remain substantially constant over the range of battery supply voltages between $V_{DD\ HIGH}$ and $V_{DD\ LOW}$.

During the time that lamp 18 is to be OFF, charging circuit 20 does not provide a high voltage for charging the capacitor 26 (see FIG. 5(a)), so that the output of Schmitt trigger Q1 is not changed in state in response to a threshold switching voltage provided at terminal 24. Therefore, no current will flow through lamp 18 over any period of time, and the lamp will remain extinguished. When the lamp 18 is ON, the relatively rapid rate at which battery current is switched through the lamp by the transistor T1 (approximately 400 times over 0.1 seconds, for example) will not be noticeable. Moreover, it is possible to maintain the lamp 18 in a "steady burn" or continuously ON state by adjusting the parameters of the charging circuit 20 so that it maintains a steady voltage at point A. For example, Schmitt trigger Q6 can be disconnected and Schmitt trigger Q5 operated to provide a continuously high output by appropriate bias means, as would be well within the purview of one skilled in the art. Photosensitive resistor 38 can then be connected to bias Q5 to provide a low output during daylight hours, so that the lamp 18 will be extinguished during such time, if desired.

FIG. 6 represents another embodiment of a battery regulation circuit in accordance with the present invention. The components of this embodiment, referred to generally by reference numeral 60 are similar to components in the circuit 10 of FIG. 3 and are given corresponding reference characters. The circuit 60 also operates to flash lamp 18' ON and OFF over predetermined time intervals, and to maintain the power delivered to the lamp 18' at a substantially constant level to obtain maximum battery life.

Circuit 60 includes six Schmitt triggers Q1'-Q6', all of which may be provided on a single integrated circuit chip (IC) such as the RCA type CD40106B, but uses a PNP type switching transistor T2 for switching current through lamp 18' instead of the NPN transistor T1 in FIG. 3. Thus, Q2' operates alone to provide a load current control signal at 68, there being no need for an inverting stage thereafter to drive T2. Q1' is coupled between the discharge diode 46' and the output of Schmitt trigger pair Q3', Q4', as shown.

Additional components include a resistor 70 for setting zener diode 44' to establish a low battery voltage cutoff for the circuit 60, a stablizing base resistor 72 at the input of T2, and a blocking diode 74 for preventing damage to integrated circuits such as the type CD40106B, the diode 74 being connected between ground and a ground connection terminal $V_{SS}$ on the IC. Furthermore, bypass capacitor 76 is connected across the switching transistor T2, as shown, to eliminate parasitic oscillations within the IC and to help reduce the internal impedance of the battery supply $V_{DD}$, thereby providing a uniform switching level throughout the useful battery life.

Referring next to FIG. 7, yet another embodiment of the present invention is shown. This circuit generally referred to by reference numeral 80 regulates power delivered to lamp 18' while steadily illuminating it, rather than causing it to flash intermittently as do the circuits 10 and 60 of FIGS. 3 and 6, respectively. Circuit 80 is, in other respects, similar to circuit 60 of FIG. 6 in its arrangement and operation, the major difference residing in charging circuit 82 wherein Schmitt triggers Q5' and Q6' are coupled together by way of resistors 84 and 86, as shown, to maintain a steady voltage at point A. During daylight hours, however, the output of Q5' is set low by the photosensitive resistor 38.

Also included in the circuit 80 of FIG. 7 is a capacitor 88 connected between the output of Schmitt trigger Q2' and the input of Schmitt trigger Q5'. This ensures that Q5' will be biased to provide a high output (lamp 18' ON) once the ambient light falls below a particular level, and will thereafter be biased to provide a low output (lamp 18' OFF) once the light exceeds the same level. The provision of capacitor 88 overcomes any hysteresis present in the switching voltage characteristic of Schmitt trigger Q5' by applying a pulse waveform, which is present at the output of Q2', to the input of Q5' to momentarily switch the latter ON and OFF. The result is that Q5' will exhibit approximately the same threshold switching level for both positive and negative going bias voltages.

As will be readily apparent to those skilled in the art, the present invention may be realized in other specific forms without departing from its spirit or essential characteristics. For example, the circuitry disclosed herein can be used for regulating power consumed by loads other than warning lamps, provided the load can operate with current supplied thereto over rapidly successive time periods, rather than continuously.

The present embodiments are, therefore to be considered as illustrative and not restrictive, the scope of the invention being indicated by the claims rather than by the foregoing description, and all changes which come within the meaning and range of equivalents of the claims are therefore intended to be embraced therein.

What is claimed is:

1. A circuit for regulating power delivered from a voltage source supplying a source voltage having a magnitude which varies to a load to maintain the average power consumed by the load substantially constant and independent of the magnitude of the source voltage to extend the useful life of said voltage source, comprising: a signal generator for producing a signal voltage, the magnitude of which varies between a first level and a second level, switching means having not more than a single signal input coupled to receive the signal produced by said generator and having a switching threshold which varies in a manner functionally related to the magnitude of the varying source voltage, said switching threshold being between said first and second levels, said switching means being responsive to the magnitude of said signal voltage to switch from a first to a second state when the magnitude of the signal voltage bears a predetermined relationship to the switching threshold of said switching means established by the magnitude of said source voltage to supply power to said load only when said switching means is in said second state, and to maintain the average power consumed by the load substantially constant.

2. A circuit for regulating power delivered from a voltage source supplying a source voltage having a magnitude which varies to a load to maintain the average power consumed by the load substantially constant and independent of the magnitude of the source voltage to extend the useful life of said voltage source, comprising: a switching circuit having not more than a single signal input terminal and having an output terminal and a switching threshold which varies in accordance with the magnitude of the source voltage, means coupled to the input terminal of said switching circuit for supplying a signal thereto which increases in magnitude with time from a magnitude below said switching threshold to a magnitude above said switching threshold to switch said switching circuit from a first state to a second state in response thereto so that the average power supplied to the load will be maintained substantially constant as the magnitude of the source voltage changes, power being applied to said load only when said switching circuit is in said second state.

3. A circuit for regulating power delivered from a voltage source supplying voltage having a magnitude which varies to a load to maintain the average power consumed by the load substantially constant and independent of the magnitude of the source voltage to extend the useful life of said source voltage, comprising: generator means having having an output terminal for periodically generating a voltage waveform of positive slope at said output terminal, switching means including a Schmidt trigger and having an output terminal and not more than a single signal input terminal, said signal input terminal being coupled to the output terminal of said generating means and said output terminal being directly coupled to said load, said switching means having a varying switching threshold established by the magnitude of said voltage so that said switching means responds to the signal from said generating means for providing a signal to control current supplied to said load so that the average power consumed by said load remains substantially constant as the magnitude of the source voltage changes.

4. The circuit of claim 3 wherein said generator means includes a capacitor having one terminal coupled to the output terminal of said generator means, at least one Schmidt trigger coupled to said output terminal of said generator means for supplying charging current to said capacitor, and at least one other Schmidt trigger coupled to said output terminal of said generator means for periodically discharging said capacitor to provide said voltage waveform.

5. The circuit of claim 4 further including a zenor diode coupled in series with said capacitor for establishing a minimum supply voltage level at which said circuit operates to supply current to said load.

6. A circuit for regulating power delivered to a load from a battery voltage source which provides a source voltage signal decreasing with time as the battery is used to extend the useful life of said battery comprising, a charging circuit having an output terminal arranged to provide a first voltage for supplying a charging signal at said output terminal, a capacitor coupled to said output terminal, a discharging circuit coupled to said output terminal and arranged to periodically discharge said capacitor so that a voltage waveform of positive slope is periodically generated at said output terminal, a Schmidt trigger circuit having a switching threshold which decreases as the magnitude of the source voltage signal decreases and having an input terminal coupled to the output terminal, said Schmidt trigger being responsive to the signal at its input terminal for switching from a first state to a second state when the signal at its input terminal exceeds its switching threshold and thereafter switching from its second state back to its first state upon the discharge of said capacitor for controlling power supplied to a load circuit coupled to said Schmidt trigger so that the average power consumed by said load remains substantially constant as the source voltage signal decreases to extend the useful life of said battery.

7. A circuit for regulating power delivered to a load from a battery voltage source which provides a source voltage signal decreasing with time as the battery is used to extend the useful life of said battery comprising, a charging circuit including an output terminal and having a first pair of Schmidt triggers arranged to provide a first voltage at the output terminal which increases with time, a capacitor coupled to the output terminal of said charging circuit for receiving said first voltage, a discharging circuit including a second pair of Schmidt triggers coupled to said capacitor to periodically discharge said capacitor so that a waveform of positive slope is generated at the output terminal, a switching circuit including at least one Schmidt trigger having an input terminal coupled to the output terminal and responsive to the voltage waveform produced thereon, said Schmidt trigger having a switching threshold which decreases as the source voltage signal decreases and being arranged to periodically switch from a first state to a second state when the magnitude of the voltage waveform reaches the particular threshold level for the Schmidt trigger established by the magnitude of the source voltage signal at a particular time, said Schmidt trigger switching from its second state to its first state at a time determined by the discharge of said capacitor, a load circuit coupled to the output of said switching circuit and responsive to the state thereof such that the average power consumed by said load remains substantially constant as the magnitude of the source voltage signal changes.

8. A circuit for regulating power delivered to a load from a battery voltage source to extend the useful life of said battery comprising a first pair of Schmidt triggers arranged to provide a first voltage for supplying a charging current to a first terminal, a capacitor coupled to said first terminal, a second pair of Schmidt triggers coupled to said first terminal and arranged to periodically discharge said capacitor so that a voltage waveform of positive slope is periodically generated at said first terminal, another Schmidt trigger having its input coupled to said first terminal, and to said battery and responsive to the voltage at said first terminal for providing a signal for controlling current supplied to said load from said battery so that said current is supplied to said load over periods of time which vary inversely with the voltage of said battery.

9. A circuit is defined in claim 8, further including a zener diode coupled in series with said capacitor for establishing a minimum battery voltage level at which said circuit operates to supply current to said load.

* * * * *